UNITED STATES PATENT OFFICE.

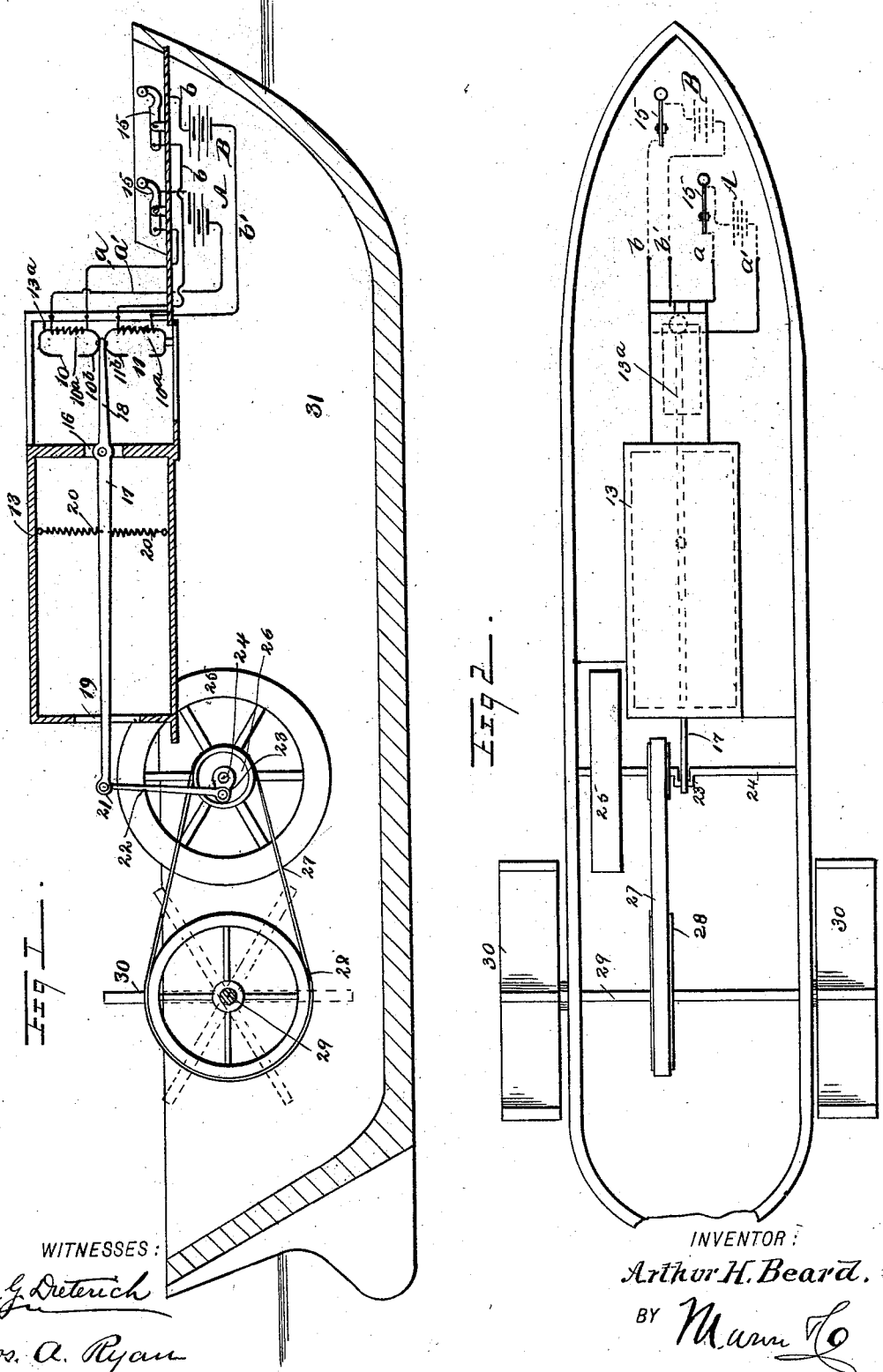

ARTHUR HOPKINS BEARD, OF MANCHESTER, ALABAMA.

ELECTRIC MOTOR.

SPECIFICATION forming part of Letters Patent No. 510,059, dated December 5, 1893.

Application filed June 10, 1892. Renewed October 27, 1893. Serial No. 489,314. (No model.)

*To all whom it may concern:*

Be it known that I, ARTHUR HOPKINS BEARD, of Manchester, in the county of Marshall and State of Alabama, have invented a new and improved Electric Motor, of which the following is a full, clear, and exact description.

My invention relates to improvements in electric motors, of the class in which a vibrating armature is held between electro-magnets, and provided with suitable converting mechanism by which its vibrations may be changed to continuous rotary motion.

My invention comprises an improved and very powerful form of magnet, and the object of my invention is to construct a motor operated by this magnet, and which is capable of producing a vast amount of power at very little expense, and which may be run by a comparatively weak electric generator.

To this end my invention consists in an electric motor the construction of which will be hereinafter described and claimed.

Reference is to be had to the accompanying drawings forming a part of this specification, in which similar figures and letters of reference indicate corresponding parts in both the views.

Figure 1 is a vertical longitudinal section of a motor embodying my invention, showing the same as applied to a vessel; and Fig. 2 is a broken plan view of the same.

In the drawings, the motor is shown as adapted to drive the paddle wheels of a vessel, simply to illustrate its use, but it will be understood that it may be made to drive any kind of machinery whatever.

The motor is provided with oppositely arranged semi-elliptical magnets 10 and 11 which form an essential feature of my invention and which are firmly secured to the projecting portion $13^a$ of a frame or housing 13. Opposite the magnets 10 and 11 are similarly shaped magnets $10^b$, $11^b$ which are secured rigidly to the projecting end 18 of the vibrating lever, as hereinafter described, and the open sides of which are placed opposite the magnets 10 and 11, as shown clearly in Fig. 1. It will be seen then that the magnet 10 and the similar magnet $10^b$ operate together and the opposite magnet $11^b$ and the magnet 11 operate together, and in order that the magnets may be suitably energized they are connected with batteries or other suitable source of electricity, the magnets 10 and $10^b$ being connected by wires $a$ and $a'$ with a battery A and the magnets $11^b$ and 11 constituting the opposite pair, being connected by wires $b$ and $b'$ with a battery B. The wires $a$ and $a'$ and $b$ and $b'$ are formed into helices which embrace but do not contact with one member of each pair of magnets 10, $10^b$, 11, $11^b$ and in operating the motor the current is sent first through the wires $a$, $a'$ and then through the wires $b$, $b'$ so that the magnets 10 and 11 are alternately energized and the magnets $10^b$, $11^b$ oscillate between the fixed magnets 10 and 11, thus imparting an oscillating movement to the lever to which the magnets $10^b$ and $11^b$ are attached. The magnets 10 and 11 are preferably placed above and below the vibrating lever and the circuit wires of each magnet connect with keys 15, substantially like an ordinary telegraph key, but any suitable circuit breaker may be used. The keys are alternately operated so as to send the circuit through the appropriate magnets.

The object of the keys or circuit breakers is to enable rapid vibrations to be sent through the wires, as it is necessary to do this to get the full force of the magnets. The keys or circuit breakers may be vibrated either by hand or by any suitable machinery. In an opening 16 at one end of the case 13 is fulcrumed an armature lever 17, the short end 18 of which projects between the adjacent ends of the magnets 10 and 11, and the longer arm of the lever is held to swing vertically in an opening 19 at the opposite end of the case 13. The magnets 10 and 11 are fastened as described, and the end 18 of the armature lever is held to vibrate between them. The lever 17 is held centered by springs 20 which are arranged above and below it, the springs being secured to the lever and to adjacent portions of the case 13 and they also serve to overcome any residual electricity which may remain in one of the magnets after the current has been turned off. The lever is pivoted at its free end as shown at 21 to a pitman 22 which connects with a crank 23 on a driving shaft 24, the latter having a suitable fly wheel 25 and the shaft has also a pulley 26 which extends transversely through the vessel 31 and has paddle wheels 30 at each end. It will be seen that the vibrations of the lever 17 will thus turn the crank shaft 24 and the motion will be transmitted to the paddles through the connections just described. This particular mechanism has been shown connecting the lever with the driving shaft simply to illustrate the fact that the motor is operative, but any ordinary mechanical movement may be substituted for the crank connection shown. It will be seen that the shorter end portion 18 of the armature lever has a very limited movement, but as the longer portion of the lever has a correspondingly larger movement, motion will be transmitted with each and a great deal of power is imparted, as the magnets act with tremendous energy on the lever owing partly to the very limited movement of the end 18 and to a greater extent to the enormous power of the magnets.

I have found by careful experiments that the magnets constructed in the form shown are much more powerful than when made in the ordinary way. It will be understood of course, that in operating the motor, the current should be first passed through one magnet and then through the other so that they will act alternately on the lever 17.

It will be observed from the foregoing description that the vibrating lever is arranged so that the end 18 acts as an armature, vibrating as it does between the magnets 10 and 11.

Having thus fully described my invention, I claim as new and desire to secure by Letters Patent—

An electric motor, comprising oppositely arranged fixed magnets, a vibrating lever held to move between the magnets, a second set of magnets secured to the vibrating lever and extending opposite the stationary magnets, helices loosely embracing one member of each set of magnets, the helices being arranged in electric circuits, and circuit breakers arranged in said circuits and adapted to permit the alternation of the current through the opposite pairs of magnets.

ARTHUR HOPKINS BEARD.

Witnesses:
C. C. NESMITH,
J. H. ZASTROW.